United States Patent [19]

Duncan et al.

[11] Patent Number: 5,130,556
[45] Date of Patent: Jul. 14, 1992

[54] PHOTOELECTRIC FIBER THICKNESS AND EDGE POSITION SENSOR

[75] Inventors: Eugene F. Duncan, Wauwatosa; Gregory L. Nadolski, Brookfield, both of Wis.

[73] Assignee: Eaton Corporation, Cleveland, Ohio

[21] Appl. No.: 609,867

[22] Filed: Nov. 7, 1990

[51] Int. Cl.⁵ .................. G01N 21/86; G01V 9/04
[52] U.S. Cl. ..................... 250/560; 250/561; 356/387
[58] Field of Search .......... 250/229, 231.1, 560, 250/561, 211 K, 231.19; 356/384–387, 238, 429–431, 375; 73/705

[56] References Cited

U.S. PATENT DOCUMENTS

| | | | |
|---|---|---|---|
| 3,743,026 | 7/1973 | Gill et al. | 250/231.1 |
| 3,912,193 | 10/1975 | Calvaer | 242/57.1 |
| 3,945,089 | 2/1976 | Brown | 356/429 |
| 3,947,129 | 3/1976 | Wiklund | 356/159 |
| 4,122,337 | 10/1978 | Okuda et al. | 250/231.19 |
| 4,171,161 | 10/1979 | Jung | 356/383 |
| 4,608,496 | 8/1986 | Rosen | 250/561 |
| 4,680,806 | 7/1987 | Bolza-Schunemann | 382/65 |
| 4,827,436 | 5/1989 | Sabersky et al. | 364/559 |
| 4,874,939 | 10/1989 | Nishimoto et al. | 250/211 K |
| 4,887,904 | 12/1989 | Nakazato et al. | 356/375 |
| 4,914,307 | 4/1990 | Kanev | 250/560 |
| 4,937,460 | 6/1990 | Duncan et al. | 250/561 |
| 4,938,062 | 7/1990 | Shimizu et al. | 250/231.19 |
| 4,991,761 | 2/1991 | Gnuechtel et al. | 250/560 |
| 5,012,086 | 4/1991 | Barnard | 250/231.1 |
| 5,017,797 | 5/1991 | Uramoto et al. | 250/561 |

Primary Examiner—David C. Nelms
Assistant Examiner—Michael Messinger
Attorney, Agent, or Firm—L. H. Uthoff, Jr.

[57] ABSTRACT

An optoelectronic position-sensitive detector (PSD) is used with a light emitting diode (LED) in a through-beam photoelectric sensor application to detect the lateral position of an edge of an article or the lateral position or size variation of a thin object such as a small diameter fiber. The LED is offset toward one end of the PSD to establish a higher output signal at one end of the PSD than at an opposite end, thereby maintaining a positive output signal for the sensor. The LED and the PSD are potted with clear epoxy within holes in aluminum housing plates to provide RFI and EMI shielding.

8 Claims, 3 Drawing Sheets

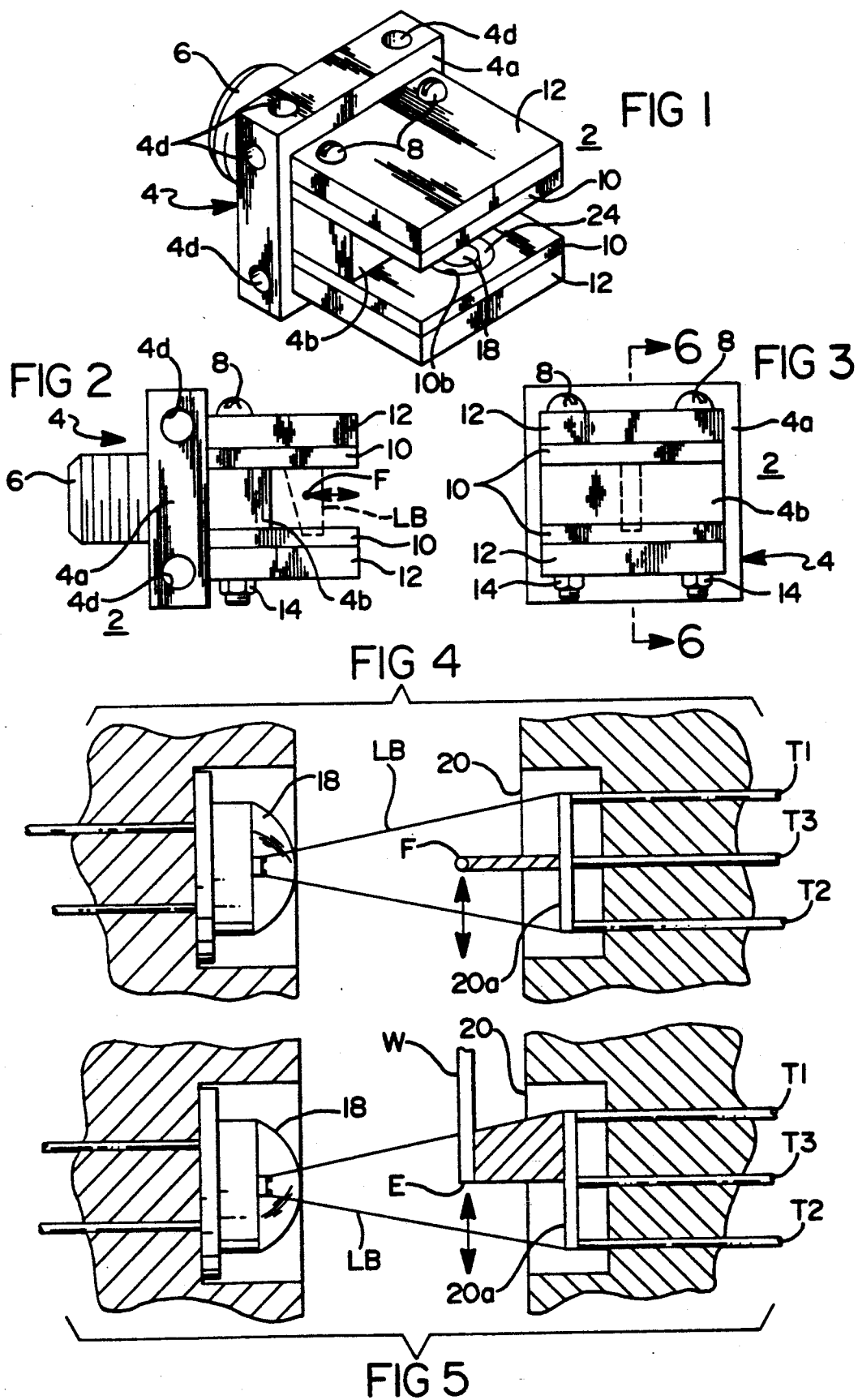

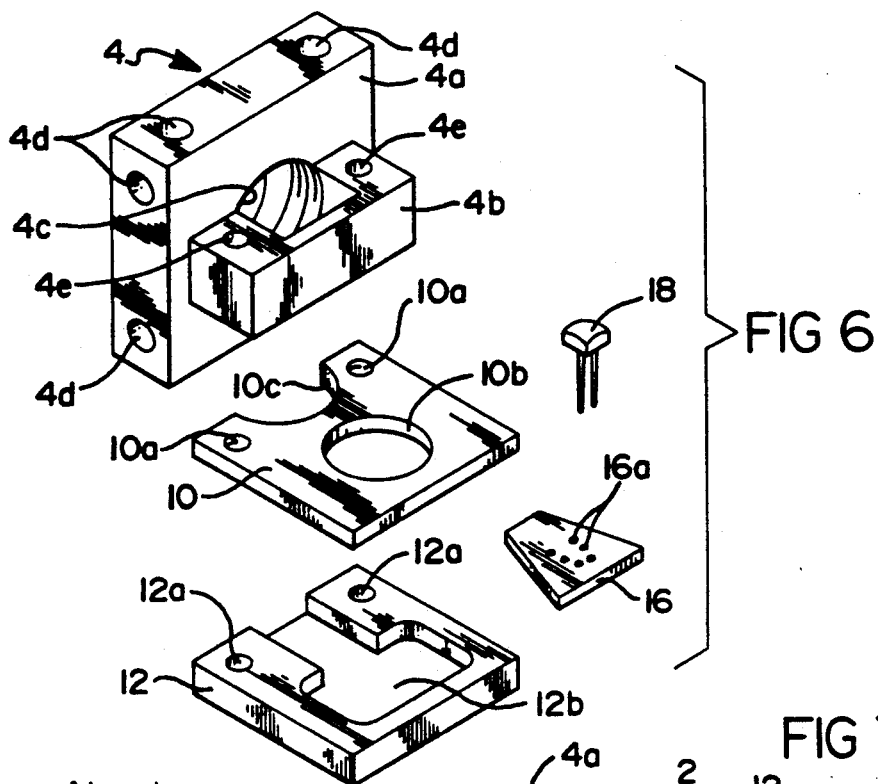
FIG 6
FIG 7
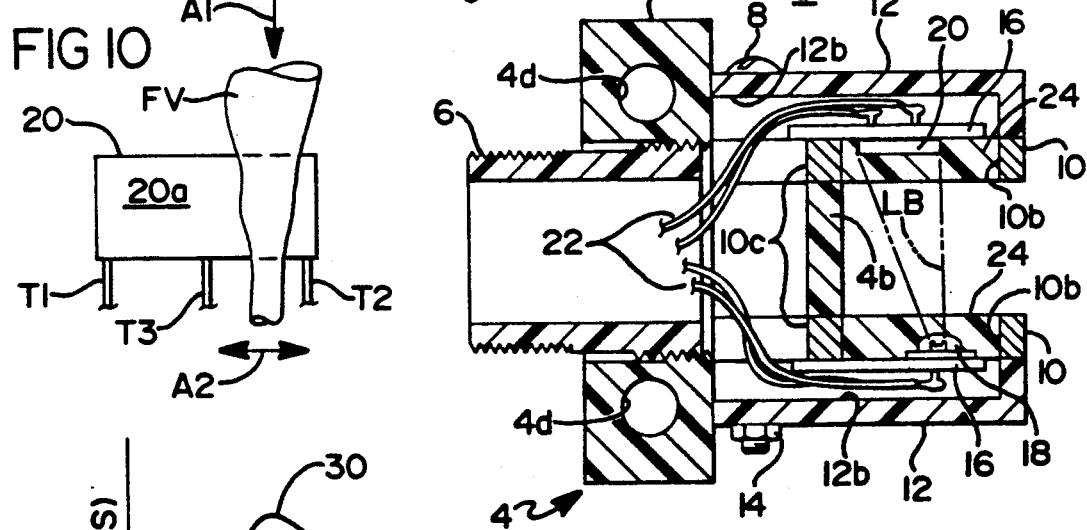
FIG 10
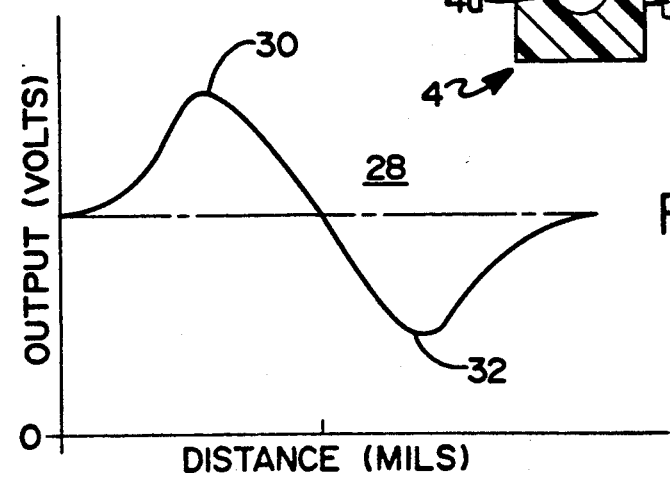
FIG 8

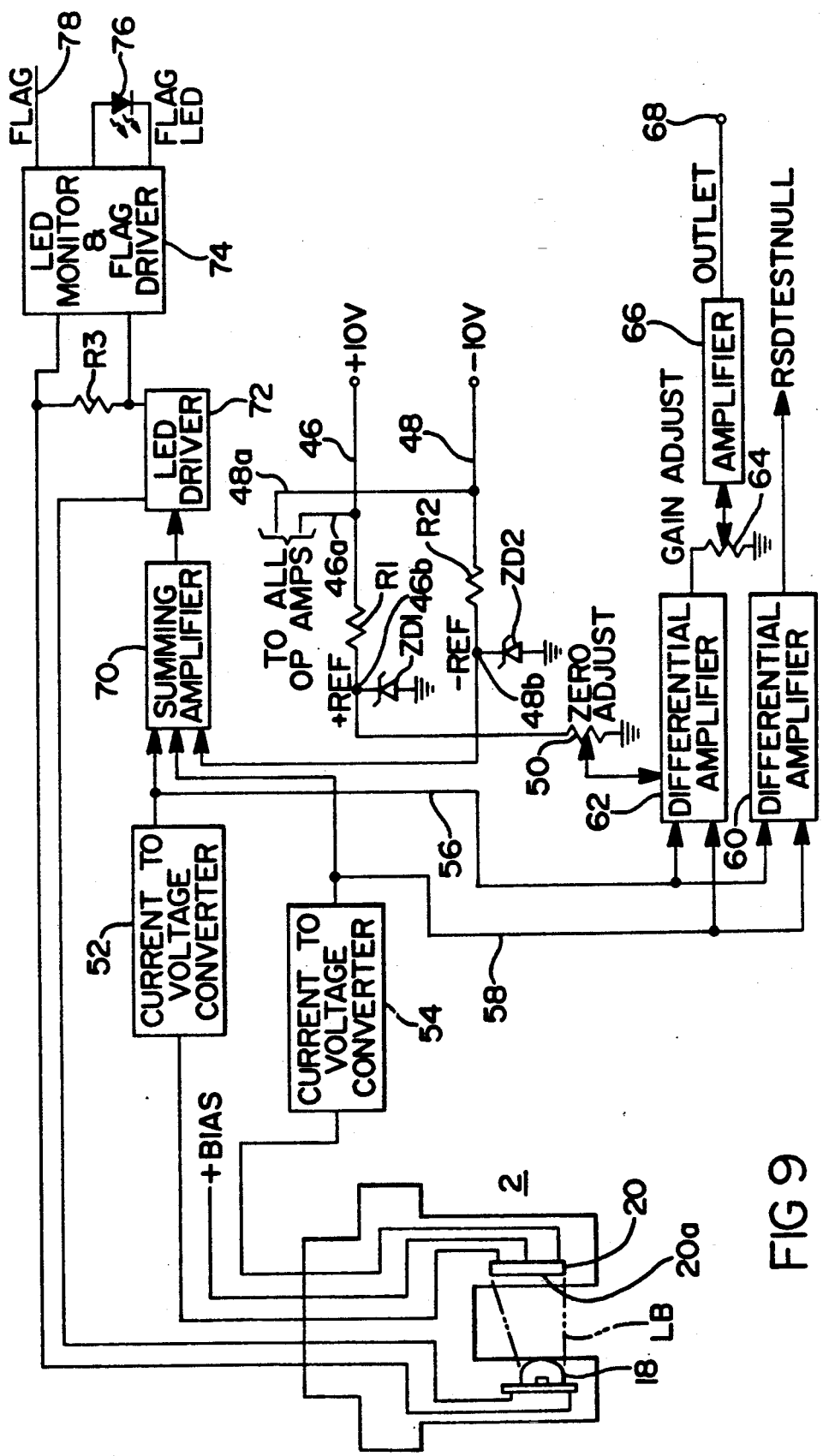

PHOTOELECTRIC FIBER THICKNESS AND EDGE POSITION SENSOR

BACKGROUND OF THE INVENTION

This invention relates to photoelectric sensors of the type for non-contact sensing of the lateral position (side-to-side displacement) of an object, an edge of that object, or a pair of edges of that object (thickness variations), in a sensing region. More particularly, this invention relates to through-beam sensors of the aforementioned type wherein the sensing region is located between a light source and a detector. Still more particularly, the invention relates to photoelectric sensors of the aforementioned type which realize improved signal strength and stability and provide continuous sensing and indication of the aforesaid position throughout the entire sensing region.

In manufacturing process control, it is often necessary to monitor a running length of material such as a fiber or web to detect lateral excursion of the fiber or web from the desired path or to detect thickness of a fiber. Due to fragility of the fiber or web, such sensing is customarily accomplished by non-contact detection such as with a through-beam photoelectric sensor. Sensors of this type typically use an LED emitter and a simple single output phototransistor or photodiode detector. The difference in output of such detectors between fully blocked and unblocked conditions of the beam is small, particularly when detecting small diameter fibers that block only a portion of the beam and permit a majority of the beam to impinge the detector. As a result, such detectors are susceptible to problems caused by the affects of contamination, electrical noise and drift. Moreover, such sensors do not provide a continuous indication of the position of a small diameter fiber when the same is fully within the light beam and moving between the edges of the beam.

Photodiode arrays, also called line arrays, have been used in through-beam sensing applications. Photodiode arrays have a multiplicity of photodiodes (often 512) arranged in a line. The outputs of the individual diodes are multiplexed and the time sequence of the output relates position of light (and shadow) on the array. The required multiplexing circuit adds cost to the sensor and has too long a response time for high speed sensing due to the length of time required to sequentially read the responses of the individual diodes of the array.

A position-sensitive detector (PSD) provides a substantially stronger and more stable output signal and a fast response time, making it very suitable for industrial control applications. A PSD is an optoelectronic sensor that responds to a light spot impinging its surface, providing continuous position data of that spot as the spot travels along the surface. However, through-beam sensor applications work on the principle of projecting a shadow on the detector, responding to light intensity. Heretofore, PSDs have not been employed in through-beam sensor applications.

SUMMARY OF THE INVENTION

This invention provides a non-contact photoelectric sensor for sensing lateral position or size variations of an object in a sensing region wherein a position-sensitive detector (PSD) is disposed at one side of said sensing region and a light source is disposed at an opposite side of the sensing region, the light source being directed toward the PSD to illuminate the same, an object present in said sensing region blocking at least a portion of said light to effect a shadow on at least a portion of said PSD, and electronic means receiving and comparing output signals from said PSD and obtaining a resultant single output signal indicative of lateral position or size variation of the object within the sensing region. The light source is offset with respect to the PSD to provide greater light intensity at one end of the PSD relative to the other end, thereby to provide an always positive output signal for the sensor. The sensor provided by this invention attains a strong and stable signal in an economic manner. The relatively short distance between the light source and the PSD permit it to operate under a steady state light source, eliminating any requirement for a more complicated pulse modulated light source. The comparator circuit is economically provided. The invention provides total position sensing throughout the sensing region (beam width). The output of the sensor is very nearly linear in the central portion of the sensing region which renders the sensor very suitable for industrial control applications. These and other advantages of the photoelectric position sensor of this invention will become more readily apparent in the following specification and claims when read in conjunction with the accompanying drawings.

BRIEF DESCRIPTION OF THE DRAWINGS

FIG. 1 is an isometric view of the position sensor of this invention;

FIG. 2 is a side elevational view of the position sensor shown in FIG. 1;

FIG. 3 is an end elevational view of the position sensor shown in FIG. 1;

FIG. 4 is a schematic view of the position sensor of this invention sensing a narrow object such as a small diameter fiber or thread;

FIG. 5 is a schematic view of the sensor of this invention similar to FIG. 4 but sensing the position of an edge of a web of material or the like;

FIG. 6 is an exploded isometric view of certain parts of the position sensor shown in FIG. 1;

FIG. 7 is a cross sectional view of the position sensor taken along the line 6—6 in FIG. 3;

FIG. 8 is a graph representing the output of the position sensor of this invention as a narrow object, such as the thread or fiber element shown in FIG. 4, moves through the sensing region;

FIG. 9 is a block diagram of the electronic circuit of the position sensor of this invention; and FIG. 10 is a schematic view of a position sensor of this invention sensing variations in size or thickness of a small diameter fiber or thread.

DETAILED DESCRIPTION OF THE PREFERRED EMBODIMENT

A photoelectric fiber and edge position sensor 2 constructed in accordance with this invention has a base 4 which, as best seen in FIG. 6, comprises a first rectangular block portion 4a having a second smaller rectangular block portion 4b extending centrally from one face thereof at right angles thereto. Base 4 is preferably formed of an electrically insulating plastic material and may be molded, machined or fabricated, or combinations of the foregoing. A hole 4c is formed centrally of the rectangular block portion 4a and extends partially into the block portion 4b, but not entirely therethrough. The diameter of hole 4c is larger than the height of block portion 4b, and therefore provides openings in the upper and lower surfaces of block portion 4b. Hole 4c is internally threaded to receive a nipple 6 therein for connection of the sensor to an external system. The nipple 6 may contain a multiple pin connector (not shown) to which wire leads of the photoelectric elements of the sensor may be hard wired. Rectangular portion 4a is provided with two pairs of mounting holes 4d extending lengthwise edge-to-edge, the holes extending in one direction intersecting with the corresponding holes extending in the other direction. Rectangular block portion 4b has a pair of clearance holes 4e (FIG. 6) for screws 8, the holes 4e extending completely through the rectangular block portion 4b between the upper and lower surfaces thereof.

An aluminum face plate 10 and an insulating cover 12 are positioned together face-to-face and positioned against either the upper or lower surface of rectangular block portion 4b. A second identical face plate 10 and insulating cover 12 are similarly positioned against the other of the upper or lower surface of rectangular block portion 4b. A pair of screws 8 are inserted through clearance holes 10a in face plates 10 and 12a in covers 12 (FIG. 6) and through clearance holes 4e to receive nuts 14 thereon to secure the members 4, 10 and 12 together. Referring particularly to FIG. 6 wherein only one of the respective face plates 10 and covers 12 is shown in exploded view, the face plate 10 comprises an essentially rectangular flat aluminum plate which has a large diameter hole 10b formed therethrough near one edge, and a semicircular notch 10c formed centrally along an edge that abuts the face of rectangular block portion 4a of mounting block 4 when assembled. The open space provided by semicircular notch 10c generally aligns with the opening of hole 4c through the respective upper or lower surface of rectangular block portion 4b. Insulating cover 12 is also a rectangular member having the same external dimensions as face plate 10. A T-shaped recess 12b is provided in one surface of cover 12 which is adjacent face plate 10 in assembly. The portion of recess 12b which assimilates the support leg of the "T" aligns with the circular notch 10c and the distal end thereof is open to the edge of cover 12 that abuts the face of block portion 4a. The circular hole 10b generally aligns with the cross bar portion of the T-shape recess 12b.

A trapezoidally shaped phenolic mounting board 16 having a plurality of holes 16a therethrough is disposed within the cavity 12b. The holes 16a receive the wire leads of either an LED 18 or a position-sensitive detector (PSD) 20, the wire leads extending through the board to be hard wired to the previously mentioned, but not shown, multi-pin connector or other external connector device, through flexible insulated wire elements such as 22 (FIG. 7). The mounting boards 16 are disposed flush against an internal face of face plate 10 and the respective LED 18 or PSD 20 are disposed within the holes 10b. Mounting boards 16 are slidably movable along the respective face plates 10 to adjust the relative alignment between LED 18 and PSD 20. As shown particularly in FIG. 7, LED 18 is aligned more closely with one end of the PSD 20 to provide increased intensity light at that one end of the PSD 20 relative to the intensity of the light at the opposite end of PSD 20. In so doing, the output signal for the sensor is maintained above a zero level to provide an always positive output signal. When the desired alignment has been attained, the holes 10b are filed with a clear epoxy potting compound to protect the photoelectric elements and to retain their adjusted position. Some of the potting compound flows around the edges of the trapezoidally shaped mounting board 16 into the recess 12b to further secure the position of the mounting board within the recess. The material of the aluminum face plate 10 surrounding the respective LED 18 and PSD 20 provides shielding for the sensor from RFI and EMI signals.

The fully assembled sensor 2 has an open slot defined by mutually adjacent faces of face plates 10 and by the distal edge of rectangular block portion 4b. LED 18 directs a light beam LB onto a light responsive surface 20a of PSD 20. A sensing region for the sensor is defined by the light beam LB within the slot of the sensor.

A position-sensitive detector such as PSD 20 is a semiconductor device having an input terminal and two output terminals. A bias voltage is applied to the input terminal. Light incident on a photo-sensitive surface of the PSD generates an electric charge on the PSD at the point of incident light, the charge being proportional to the intensity of the light. The charge is then driven through a layer of the semiconductor device and is collected as photocurrent by the respective electrodes, or output terminals. The photocurrent collected by a respective terminal is inversely proportional to the distance between the incident light position and the terminal. By finding the ratio of the photocurrents at the two electrodes, or output terminals, the position of incident light can be found irrespective of the intensity of the incident light.

Referring to FIG. 4, LED 18 is arranged to illuminate the photo-sensitive surface 20a of PSD 20 by directing the light beam LB onto that surface. By illuminating the entire surface, the photocurrent at output electrode T1 is equal to the photocurrent at output electrode T2 inasmuch as the light beam LB is centered on the surface and the intensity is equal at each of the output electrodes. Assuming the LED 18 and the PSD 20 to be intentionally misaligned as shown in FIGS. 2 and 7 whereas the intensity of the light at one output electrode is significantly greater than the intensity of the light at the other output electrode, the ratio or difference between the photocurrents at electrodes T1 and T2 is a value above a zero level such as represented on the zero ordinate in the graph of FIG. 8. As a small diameter fiber or thread F is brought into the sensing region (i.e. the light beam LB within the slot between face plates 10), light is blocked from the surface of the PSD at an end corresponding to the entry point of the fiber F into the beam LB. Assuming the fiber to enter the beam at the high intensity side, as the fiber enters the beam it casts a shadow on the surface of the PSD at one end thereof. Continued movement of the fiber into the beam creates an increasingly larger shadow until the fiber is fully within the beam at which point the ratio of the photocurrents at the two electrodes T1 and T2 is at its greatest value represented by peak 30 on the curve 28 shown in FIG. 8. As the fiber F traverses across the width of the light beam LB, its shadow travels along the surface 20a of PSD 20 as a constant width shadow. The ratio of the photocurrents at electrodes T1 to T2 decreases in a near linear manner during this excursion. As the fiber begins to exit the light beam LB (sensing region) it casts a decreasing shadow on the PSD at the opposite end thereof beginning at an inverse peak 32. Midway between the peaks 30 and 32, the curve crosses an ordinate representing the original value to indicate that the fiber is in its center position. Movement in either direction from the center position causes the output to rise or fall substantially linearly, which output can then be connected to indicating apparatus to advise that the fiber or thread F is moving laterally from a preferred position or connected directly to a control system to automatically effect some control function in response to the change in the output signal.

The same through-beam sensor 2 can be utilized to detect the position of the edge of a web of material as represented in schematic drawing, FIG. 5. The sensor 2 is positioned such that the edge E of a web of material W is positioned within the slot of the sensor 2 defined by the facing surfaces of the face plates 10 and within the light beam LB to be within the sensing region. In this embodiment, the output of the sensor 2 will increase as the edge E moves into the light beam to generate a curve similar to the first portion of curve 28 to the left of peak 30. However, as the web moves further across the light beam LB, it generates a shadow of increasing width on the photo-sensitive surface 20a of PSD 20. The output of sensor 2, which is a ratio of the currents generated at the two electrodes T1 and T2, is an increasing curve as opposed to the decreasing or negative slope between the peaks 30 and 32 of curve 28. As the edge E of web W passes completely through the light beam LB, a curve corresponding to the curve of FIG. 8 mirrors the beginning arcuate shape and then gradually tapers off to a constant value parallel to the ordinate. However, the position of the edge E throughout the major portion of the light beam would be detectable on a linear portion of the curve which is very usable in industrial control applications. Although it is recognized that the PSD is generally operated by causing a light to impinge the photo-sensitive surface at a particular spot, this invention recognizes that the inverse can be utilized and that a shadow moving along the surface of the PSD can equally be detected, thereby rendering the PSD suitable for through-beam detection where phototransistors or photodiodes had previously been utilized. A major disadvantage with the phototransistors or photodiodes is that the excursion of the small diameter fiber F, once it is fully within the light beam LB as represented by the travel between peaks 30 and 32 on curve 28 shown in FIG. 8, provides no reading or indication of position between these two points.

Another use for the through-beam sensor 2 of this invention is illustrated in FIG. 10. A fiber or thread FV is positioned within the slot of the sensor 2 and to one end of the sensing region. FIG. 10 looks at the plan surface of PSD 20 as viewed from the LED 18. Fiber FV passes through the slot of the sensor, running in the direction of arrow A1. Changes in lateral position of fiber FV in the direction of arrow A2 are detected by the sensor as described hereinbefore in conjunction with FIG. 4. In FIG. 10 the sensor detects changes in lateral position of one or both edges of the fiber to thereby detect variations in thickness of the fiber. Such variations have been exaggerated in the illustration of fiber FV. The shadow appears on surface 20a of the PSD 20 immediately behind fiber FV, and as the shadow changes, the light on the surface also changes, resulting in variations of the photo current collected at respective electrodes T1 and T2. When used in this manner, the sensor 2 could anticipate breaks of the fiber, as well as quality and tolerance control when manufacturing the fiber.

A block diagram of the electronic system of position sensor 2 is shown in FIG. 9. A bias voltage is applied to the input terminal of position-sensitive detector 20. Light incident on the surface 20a of PSD 20 from the LED 18 generates an electric charge at the surface which collects as photocurrent at the respective output terminals. The sum of the current at both output terminals equals the current present at the bias terminal which is a constant value.

The system is supplied with a plus and minus 10 volt supply over wires 46 and 48. All operational amplifiers of the system are supplied from the same plus and minus 10 volt supply over wires 46a and 48a. To compensate for irregularities in the power supply, a pair of zener controlled reference points 46b and 48b are established by voltage dropping resistors R1 and R2 in the respective lines ahead of zener diodes ZD1 and ZD2, respectively, providing a stabilized voltage of, for example, 6.2 volts for the remainder of the system.

With power supplied to the system, the position sensor is adjusted by initially moving a test fiber to the desired center position. Inasmuch as the photocurrent at each terminal on the PSD is inversely proportional to the distance between the respective terminal and the light impinging the surface 20a on either side of the shadow cast by the fiber, the signals at the output terminals of PSD 20 will be equal when the shadow is at the center of the surface 20a of PSD 20. Accordingly, the current signal into and the voltage signal out of the current to voltage converter 52 will be equal to the signal into and out of the current to voltage converter 54. These voltage signals are applied over lines 56, 58 to a differential amplifier 60 which responds to provide a "null" signal at its output terminal because the two signals cancel each other. Next the test fiber is moved to one extreme position at the edge of the light beam LB. In this position one output terminal of PSD 20 will have a high output signal and the other output terminal will have a very low output signal. The sum of the two is still constant, equaling the bias potential, but one signal overpowers the other and must be offset. A zero adjust potentiometer 50 is provided for this purpose, applying a voltage signal of opposite polarity to the signal from the low side output terminal of PSD 20 to adjust the output of differential amplifier 62 to zero. After the zero adjust, the test fiber is moved to the opposite extreme position and the gain adjustment potentiometer 64 is adjusted to provide a desired output for the system at the output 68 of amplifier 66, the output 68 being the output for the position sensor 2 and being on the order of 5 volts. Inasmuch as the PSD 20 output is substantially linear as long as the shadow does not travel off the ends of PSD 20, the system output will be linear from zero to 5 volts.

The system is also provided with a luminous feedback loop comprising a summing amplifier 70 and an LED driver circuit 72. The negative reference voltage from point 48b is fed into summing amplifier 70, as are the output voltage signals from current to voltage converters 52 and 54. The negative reference voltage signal forces the sum of outputs of converters 52 and 54 to be constant at all times. When that sum is not constant, amplifier 70 adjusts the signal to LED driver 72 which in turn adjusts upward or downward the signal to LED 18 to drive the LED harder or softer to maintain the summed signals constant. It is not desirable, however, to drive LED 18 at 100% or more of its rated capacity in order to maintain the constant output. Increases in driving signals usually mean contamination between the LED and the PSD and requires cleaning of the sensor 2.

The position sensor of this invention is provided with an indicator or flag circuit 74 for indicating when the LED driver 72 is driving the LED 18 too hard, which suggests the sensor needs cleaning. A current sampling resistor R3 is connected in one of the lines to LED 18 from LED driver 72. Opposite sides of resistor R3 are connected to the monitor and flag driver circuit 74 which responds when the current to LED 18 exceeds a predetermined threshold, such as 70% of the rated input for LED 18, to energize a flag LED 76 providing a visual indication, and an output 78 which may be connected to a primary control panel for the system in which sensor 2 is used.

The foregoing has described a preferred embodiment of the position sensor of this invention. It provides a sensor which is simple to manufacture and use, is highly accurate, capable of sensing very small excursions of an object and sensing very thin small articles, and is inexpensive to manufacture. This sensor provides the advantages of a position-sensitive detector in a through-beam application. Although the device has been described in the best mode contemplated for practicing the invention, it is to be understood that the invention is susceptible of various modifications without departing from the scope of the appended claims.

We claim:

1. A photoelectric fiber thickness and position sensor comprising:
   a position-sensitive detector (PSD) comprising a photo-sensitive surface having first and second output electrodes at respective first and second ends thereof, said surface generating an electric charge at a position thereon receiving incident light, said charge being inversely proportional to the incident light blocked by the fiber from impinging on said surface creating a shadow, said charge being collected as photocurrent at respective said electrodes;
   a light source spaced from said PSD indicating said surface;
   a sensing region intermediate said light source and said surface, a fiber passing through said region effecting said shadow on at least a portion of said surface, variation in diameter or lateral position of said fiber and therefore said shadow on said surface varying output signals at said respective output electrodes.

2. The photoelectric fiber thickness and position sensor defined in claim 1 wherein said light source is offset relative to said PSD, more directly aligned with said first end of said surface than with said second end.

3. The photoelectric fiber thickness and position sensor defined in claim 1 further comprising means for receiving and comparing output signals from said first and second electrodes and for producing a single resultant output signal indicative of position of said object within said sensing region.

4. The photoelectric fiber thickness and position sensor defined in claim 1 further comprising:
   a housing having a slot therein open to three sides; and
   openings in mutually facing walls defining said slot, said PSD being disposed within one said opening and said light source being disposed within an opposite one of said openings.

5. The photoelectric fiber thickness and position sensor defined in claim 4 wherein said mutually facing walls comprise electrically conductive metal providing electrical shielding for said light source and said PSD.

6. The photoelectric fiber thickness and position sensor defined in claim 5 wherein said light source and said PSD are movable within said openings for aligning said light source nearer said first end than said second end of said PSD.

7. A method of sensing lateral position or variation in thickness of a fiber passing through a sensing region comprising:
   placing an optoelectronic position sensitive detector (PSD) at one side of the sensing region;
   placing a light source at an opposite side of said sensing region;
   directing said light source across said sensing region to illuminate said PSD;
   passing a fiber through said sensing region, said fiber blocking at least a portion of light emitted from said light source, thereby effecting a shadow on at least a portion of said PSD; and
   comparing output signals from said PSD and obtaining a resultant single output signal indicative of the lateral position or variation in thickness of said fiber passing through said sensing region.

8. The method of sensing lateral position or variation in thickness of a fiber passing through a sensing region defined in claim 7 further comprising:
   offsetting said light source laterally relative to said PSD to effect increased light intensity incident one end of said PSD relative to an opposite end of said PSD.

* * * * *